United States Patent [19]

Climo

[11] 4,020,725

[45] May 3, 1977

[54] PERFORATING APPARATUS

[75] Inventor: Benjamin G. Climo, Pont Rouge, Canada

[73] Assignee: Exxon Research and Engineering Company, Linden, N.J.

[22] Filed: Aug. 27, 1975

[21] Appl. No.: 608,070

[52] U.S. Cl. .................................... 83/349; 83/30; 83/347; 83/669; 83/691

[51] Int. Cl.² ..................... B23D 25/04; B26F 1/10

[58] Field of Search .............. 83/30, 341, 345, 347, 83/660, 669, 691, 112, 113, 349, 425.4

[56] References Cited

UNITED STATES PATENTS

| | | | |
|---|---|---|---|
| 226,184 | 4/1880 | Murray | 83/425.4 |
| 3,799,015 | 3/1974 | Bush, Jr. et al. | 83/112 X |
| 3,858,469 | 1/1975 | Hibbing et al. | 83/660 X |

*Primary Examiner*—Willie G. Abercrombie
*Attorney, Agent, or Firm*—D. F. Wohlers

[57] ABSTRACT

An apparatus for perforating sheet material during travel of the latter in a given plane. The apparatus includes rotary punches which penetrate through the sheet material during travel thereof. The punches turn around an axis extending transversely with respect to the direction of travel of the sheet material so that each punch approaches the plane of the sheet material to initially contact the latter and then penetrate through and be retracted from the sheet material. Each punch has a concave punching end surface forming part of a cylinder whose axis is perpendicular to the punch axis and parallel to the axis around which each punch turns while approaching the plane of the sheet material. Thus, each punch has at its punching end leading and trailing tips which lead and trail considered in the direction of rotation of each punch. The positioning of each punch and the construction thereof is such that the leading and trailing tips of each punch become situated simultaneously in the plane of the sheet material when each punch initially contacts the sheet material.

7 Claims, 7 Drawing Figures

PERFORATING APPARATUS

BACKGROUND OF THE INVENTION

The present invention relates to sheet-perforating apparatus.

In order to manufacture perforated sheet material, as required for many different purposes, it is necessary to provide an apparatus capable of punching through the sheet material as the latter travels in order to achieve a continuously operating construction which will provide certain economies in the manufacture of the perforated sheet material. At the present time apparatus designed for this purpose suffers from several drawbacks. The known apparatus is extremely noisy and operates with a considerable amount of undesirable vibrations. The output which can be obtained with conventional apparatus is relatively low and continuous operation cannot be maintained over long periods of time because maintenance is required at frequent intervals. The maintenance operations of the conventional apparatus require special tools and special power supplies are sometimes required for the conventional apparatus.

In the case where the sheet material which is to be perforated is extruded, one of the problems encountered with conventional apparatus is that the speed with which the extruded sheet material can be punched, which is to say the linear speed of travel of the sheet material during the punching thereof, is of necessity less than the linear speed of the sheet material issuing from the extruder, so that a continuous operation from the extruder through the perforating apparatus cannot be achieved.

In addition, the material which is punched from the perforated sheet material accumulates undesirably and must be removed from time to time, creating undesirable labor costs.

One of the particular problems encountered is in connection with the formation of the perforations themselves. The punches tend to tear the sheet material instead of cutting cleanly therethrough. In order to solve this latter problem some punches take the form of hollow tubes having sharp cutting ends which operate in the manner of a cookie cutter cutting into the sheet material while pressing the latter against an anvil surface, but such constructions are not suitable for cutting through plastics or metals of the type required for venting soffits used in building structures. It has also been proposed to provide rotary anvils formed with bores which register with the punches and which receive the punches as they pierce through the sheet material so that in this way also an attempt has been made to provide cleanly cut perforations, but this construction also creates great problems in connection with proper registry of the bores of the anvil with additional problems being encountered in connection with removal of the punched material from the bores.

SUMMARY OF THE INVENTION

It is accordingly a primary object of the present invention to provide an apparatus which will avoid the above drawbacks.

In particular, it is an object of the present invention to provide a perforating apparatus having punches capable of cleanly cutting through the sheet material without tearing the latter and while at the same time avoiding any problems such as those in connection with registration of anvil apertures with the punches or removal of the punched material.

It is furthermore an object of the present invention to provide an apparatus of the above type which can operate in a manner which will not require the speed of travel of the sheet material to be reduced with respect to the linear speed of issue of the sheet material from an extruder.

Also it is an object of the present invention to provide an apparatus of the above type which enables the punches to be conveniently moved toward and away from an operating position so that starting up operations can be very conveniently carried out.

At the same time, it is an object of the present invention to provide a construction which will be safe so that there is very little possibility of injury to the operator.

It is furthermore an object of the present invention to provide a perforating apparatus in the form of a separate unit which can be situated in a line of units which perform successive operations on a plastic sheet which is initially formed by extrusion.

Furthermore, it is an object of the present invention to provide an apparatus of the above type which will require very little maintenance and which can operate continuously for long periods of time.

Furthermore, it is an object of the present invention to provide an apparatus of this type which, when maintenance is required, does not require the use of special tools or equipment for carrying out the maintenance operations.

According to the invention the apparatus includes a guide means which guides the sheet material for travel in a given plane during perforation of the sheet material. A rotary punch-mounting means is supported by a support means for rotation about an axis which extends transversely with respect to the direction of travel of the sheet material while being parallel to the plane in which the sheet material travels. This rotary punch-mounting means carries a plurality of punches which project outwardly beyond the rotary punch-mounting means. Each punch has an outer punching end which is concave and forms part of the surface of a cylinder whose axis is perpendicular to the punch axis and parallel to the axis of rotation of the punch-mounting means. As a result each punch has tips which lead and trail considered in the direction of rotation of the punch-mounting means, with the arrangement being such that the leading and trailing tips of each punch simultaneously contact or become situated in the plane of the sheet material when initially engaging the latter.

BRIEF DESCRIPTION OF DRAWINGS

The invention is illustrated by way of example in the accompanying drawings which form part of this application and in which.

DESCRIPTION OF PREFERRED EMBODIMENTS

Figure 7:
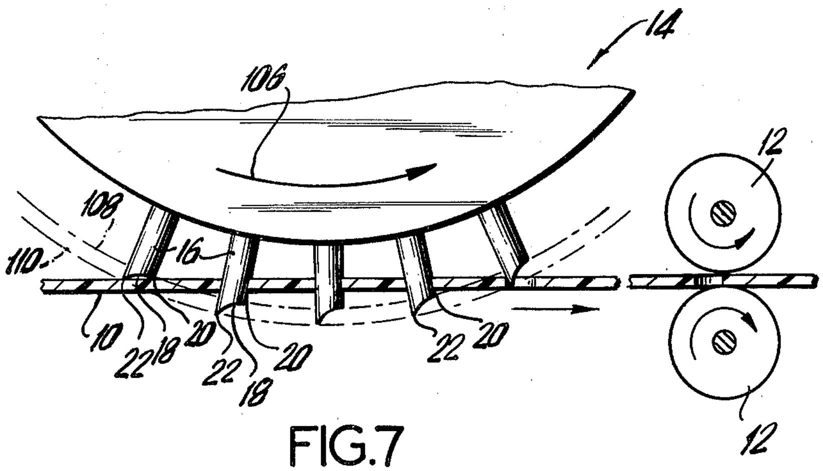
FIG. 7 is a diagrammatic representation of the principle of operation of the structure of the invention.

Referring first to FIG. 7, the principle of operation of the present invention will be readily understood therefrom. The sheet material 10 which is to be perforated is fed to the right, as viewed in FIG. 7, in a horizontal plane. For this purpose any suitable feed rolls 12 are provided, these rolls being, for example, rubber-covered driven rolls driven in any suitable way at a speed which will provide for the sheet material 10 a desirable speed of travel toward the right as viewed in FIG. 7. For example, the rolls 12 may provide for the sheet material 10 a speed of travel on the order of 5–15 feet per minute, and this speed will in general correspond to the speed with which the sheet material issues from an extruder (not shown), in the event that the apparatus operates directly upon extruded sheet material.

Of course, before reaching the apparatus of the invention the extruded sheet material will be suitably cooled, and after the sheet material moves beyond the feed rollers 12 it may be cut into suitable lengths. Thus, the apparatus of the invention may be readily suited for use in connection with continuous manufacture of perforated sheet material issuing from an extruder. The sheet material may be plastic, such as a suitable polyvinyl chloride, or it may be a metal, such as aluminum. For purposes referred to below the plastic material may be preferred because of the fact that it has a greater elasticity than a metal sheet material such as aluminum. The apparatus of the invention is particularly suited for providing perforated soffits to be used in building structures at overhanging parts where the roof of the structure joins a side wall thereof so that suitable ventilation can be provided through such soffits.

As is diagrammatically shown in FIG. 7, situated over the sheet material 10 is a rotary punch-mounting means 14 the details of which are described below. This punch-mounting means 14 is supported by a support means described below so as to rotate in a counterclockwise direction, as viewed in FIG. 7, about an axis which is situated over the plane occupied by the sheet material 10 while being parallel to this plane and extending transversely to the direction of travel of the sheet material.

The punch-mounting means 14 carries a plurality of punches 16 all of which are identical and some of which are indicated in FIG. 7. The punches 16 are arranged so as to provide a predetermined pattern of perforations at each revolution of the punch-mounting means 14.

As may be seen from FIG. 7, each punch 16 has an outer punching end 18 the surface of which is concave. This concave end surface 18 is part of a cylinder whose axis is perpendicular to the axis of the punch 16 and parallel to the axis of rotation of the punch-mounting means 14. As a result, each punch has a leading tip 20 and a trailing tip 22. In the particular example illustrated in FIG. 7, the axes of the punches 16 extend radially with respect to the punch-mounting means 14. In other words each punch 16 has a longitudinal central axis which passes through the axis around which the means 14 turns. With this construction the configuration of the surface 18 which forms part of the cylinder is such that the leading tip 20 is situated nearer to the axis of rotation of the means 14 than the trailing tip 22. The difference between the radial distances of the tips 20 and 22 of each punch from the axis of rotation of the means 14 is such that both tips 20 and 22 will substantially simultaneously engage the sheet material 10 when initially contacting the latter, as illustrated in FIG. 7. As a result of this feature of the invention, as each punch 16 penetrates through the sheet material 10, material is removed from the latter during formation of each perforation in such a way that the material is simultaneously cut from the trailing end of each perforation in the direction of travel of the sheet material and from the leading end of each perforation in the directionn opposite to the direction of travel of the sheet material, so that in effect each perforation is formed by cutting sheet material in opposite directions from the leading and trailing ends of each perforation toward the center thereof. As a result it becomes possible with the structure of the invention to cut through the sheet material cleanly without tearing the latter undesirably, and at the same time it is only necessary to support and guide the sheet material 10 for movement in a plane as illustrated in FIG. 7. It is unnecessary to provide any hard flat anvil surfaces to engage sharp cutting surfaces of the punch and it is unnecessary to provide any bores with which the punches must register.

It is emphasized that the above construction of FIG. 7 represents a preferred construction according to the present invention. Other constructions are possible. For example, the concave cylindrical end surface 18 may be formed symmetrically with respect to the axis of each punch, and in this case the punches, instead of being radially positioned with respect to the axis of the means 14, may be inclined with respect to radii extending from the axis of the means 14. By suitably choosing the angle of inclination of several punches, it is also possible to achieve the results of the invention. However, the embodiment of FIG. 7 is preferred because the thrust is directly toward the axis of the means 14 during the punching operations.

The punches 16 are made of a hard material such as tool steel or tungsten carbide. The sheet material 10, particularly in the case of vented soffits, is preferably a plastic such as a suitable polyvinyl chloride. It will be noted that as the punches 16 penetrate through the sheet material and then are retracted therefrom the spacing in a circumferential direction from one punch to the next gradually diminishes because of the positioning of the several punches along the radii which converge at the axis of the means 14. As a result, during movement of the punches through and beyond the sheet material the sheet material will become longitudinally compressed to some extent, in a direction considered circumferentially from one punch to the next, while this spacing between the circumferentially arranged punches will become gradually greater as the punches are retracted out of the sheet material. The elasticity of the plastic sheet material of course lends itself ideally to such a stucture since the material can elastically adapt itself to the variation in the spacing between the successive punches considered in a circumferential direction. However, even if a material which is not of particularly great elasticity, such as aluminum sheet material, for example, is perforated with the apparatus of the invention, the only result will be that as the punches penetrate through the sheet material the openings formed by the punches will become very slightly elongated, but this effect will not in any way detract from the quality of the final product.

Figure 1:
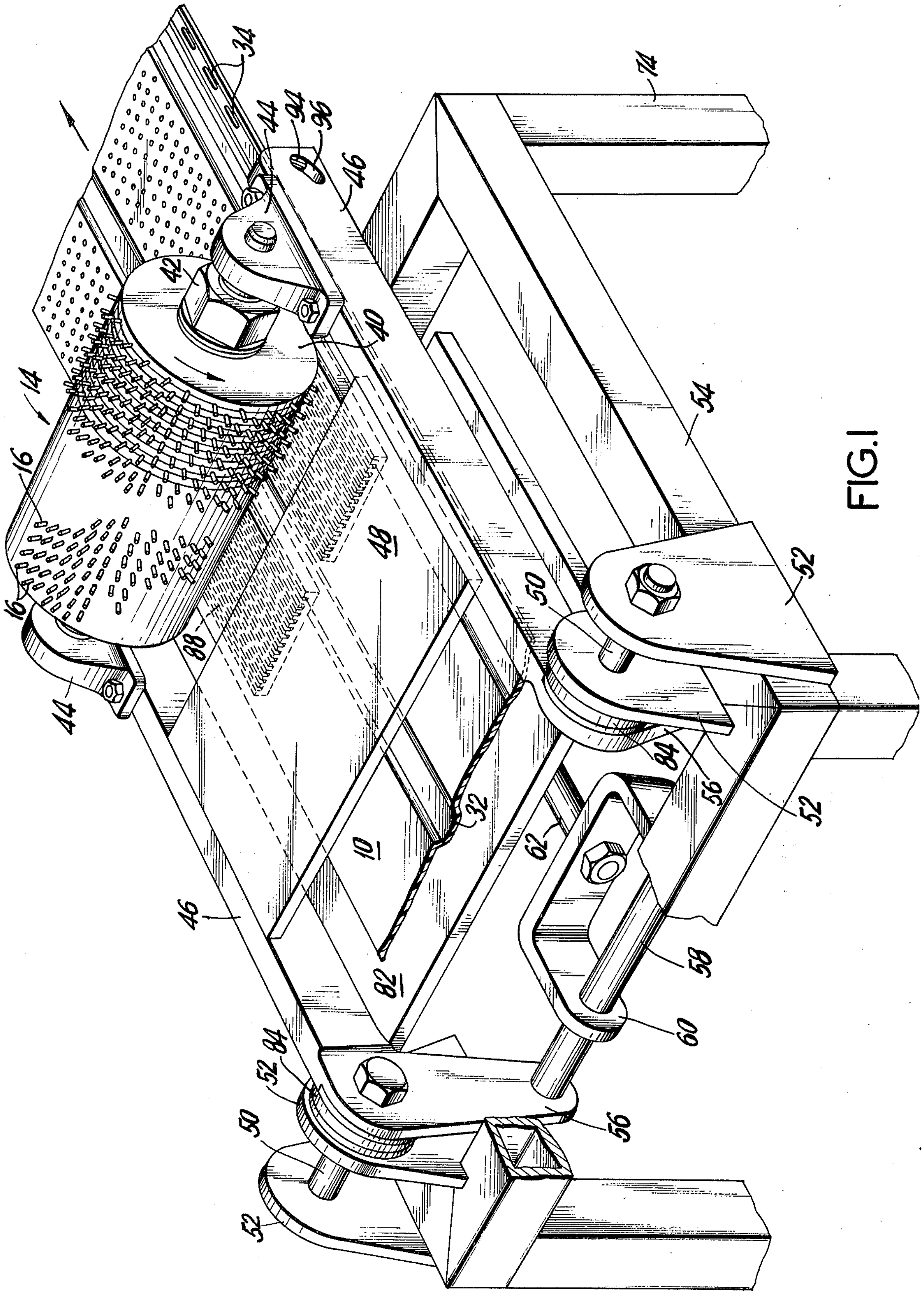
FIG. 1 is a perspective illustration of an apparatus of the invention with parts of FIG. 1 being broken away to illustrate more clearly details of the structure.
Figure 2:
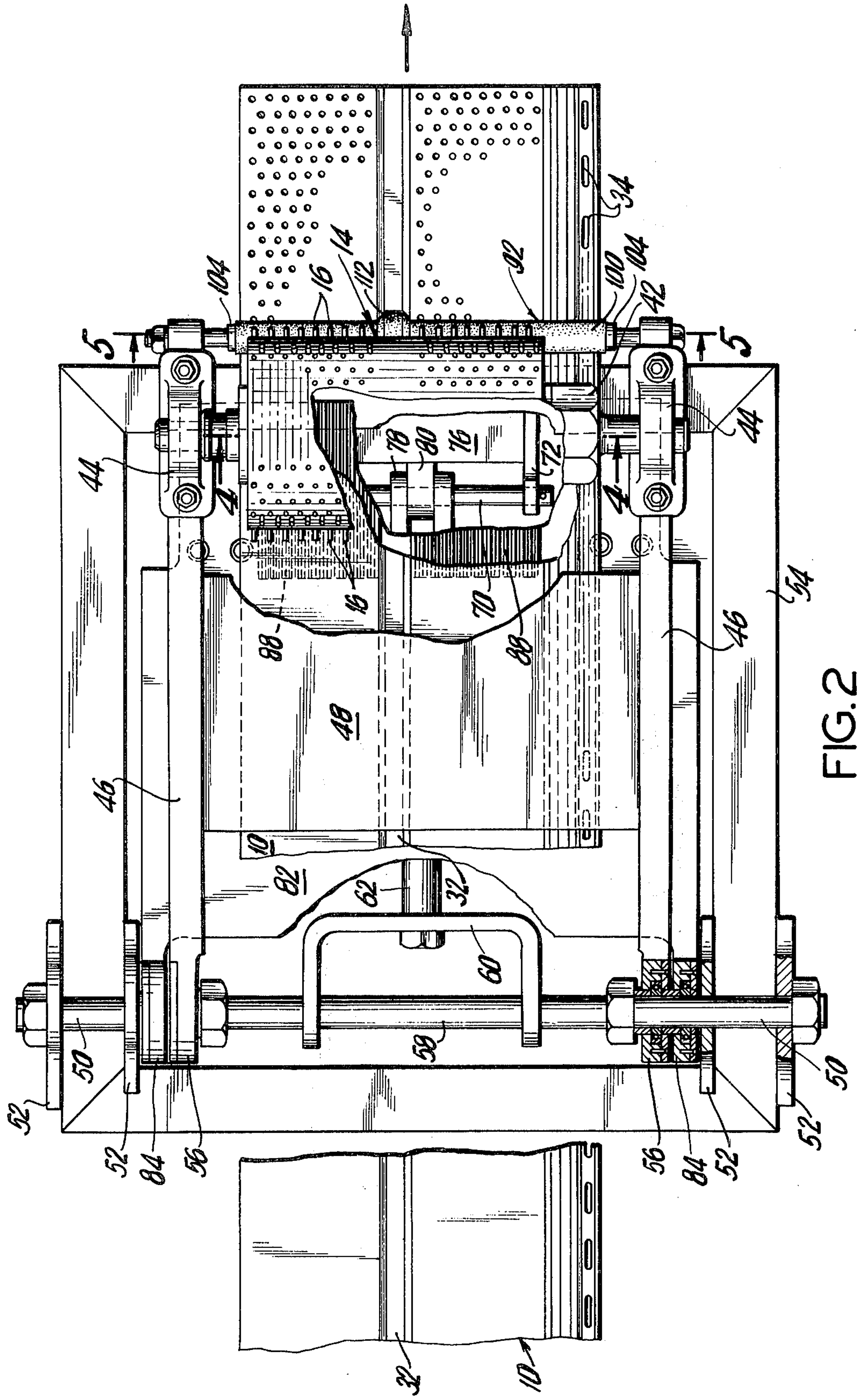
FIG. 2 is a top plan view of the apparatus of FIG. 1 with parts also being broken away and shown in section to illustrate more clearly the details of the structure.

Referring now to FIGS. 1 and 2, the rotary punch-mounting means 14 is illustrated therein with several of the punches 16 also being illustrated.

Figure 4:
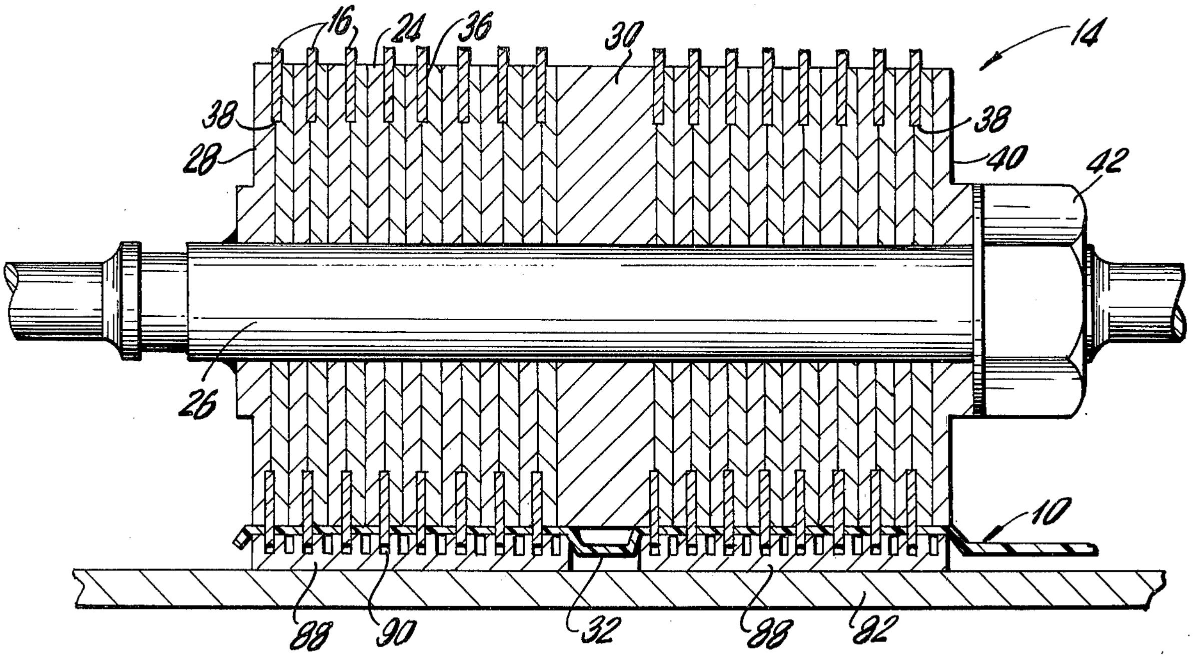
FIG. 4 is a fragmentary section taken along line 4—4 of FIG. 2 in the direction of the arrows and showing in detail the punching structure of the invention.

As may be seen from FIG. 4, the rotary punch-mounting means 14 includes a plurality of discs 24 formed with central apertures through which a shaft 26 passes as illustrated. The left end disc 28, as viewed in FIG. 4, is directly fixed to the shaft 26 as by being welded thereto. The series of discs 24 are initially loosely mounted on the shaft 26. In the illustrated example, the discs 24 are arranged in a pair of groups separated by a central thicker member 30. As may be seen from FIG. 1, the sheet material 10 is extruded in such a way that it has a central groove 32 forming the sheet with a pair of longitudinal portions on each side of the groove 32, and it is these longitudinal portions which are perforated in the illustrated example. At one edge, the sheet 10, before reaching the apparatus of the invention, is formed with elongated slots 34 for attachment purposes.

As is apparent from FIG. 4, each disc 24 is formed at one of its surfaces with grooves 36 extending radially inwardly from the periphery of disc through a distance less than the length of each punch 16 so that each groove 36 terminates in an inner end shoulder 38 against which the inner end of each punch 16 abuts. The several grooves 36 are uniformly distributed around the circumference of each disc 24, and the discs are arranged so that the grooves register with each other. The assembly is held together by and end disc 40 which is urged toward the disc 28 by a nut 42 threaded on the shaft 26. Initially the nut 42 is only slightly tightened so that the several punches 16 can be slipped into the registering grooves while remaining frictionally held by the discs 24, and of course once one punch 16 is introduced it will align all of the successive pairs of registering grooves circumferentially situated with respect to this one punch. After all of the punches are situated in a desired pattern, the nut 42 is tightened to its final position so that all of the punches are securely gripped as illustrated in FIG. 4. The discs 24 can be made of any suitable metal or plastic.

As may be seen from FIG. 1, the ends of the shaft 26 are supported for rotation in bearings carried by a pair of blocks 44 which form part of a support means for supporting the punch-mounting means 14 for rotation about the axis of the shaft 26 which of course is parallel to the plane in which the sheet material 10 travels and which is transverse with respect to the direction of travel of the sheet material 10. The blocks 44 are in turn fixedly carried by a pair of levers 46 interconnected by a transverse bracing plate 48 and supported for pivotal movement on a pair of coaxial rods 50. These rods 50 are carried by brackets 52 which are fixed to and project upwardly from a frame 54 which together with the brackets 52 and the rods 50 form a frame means for pivotally supporting the support means 44, 46 which supports the punch-mounting means 14.

Figure 3:
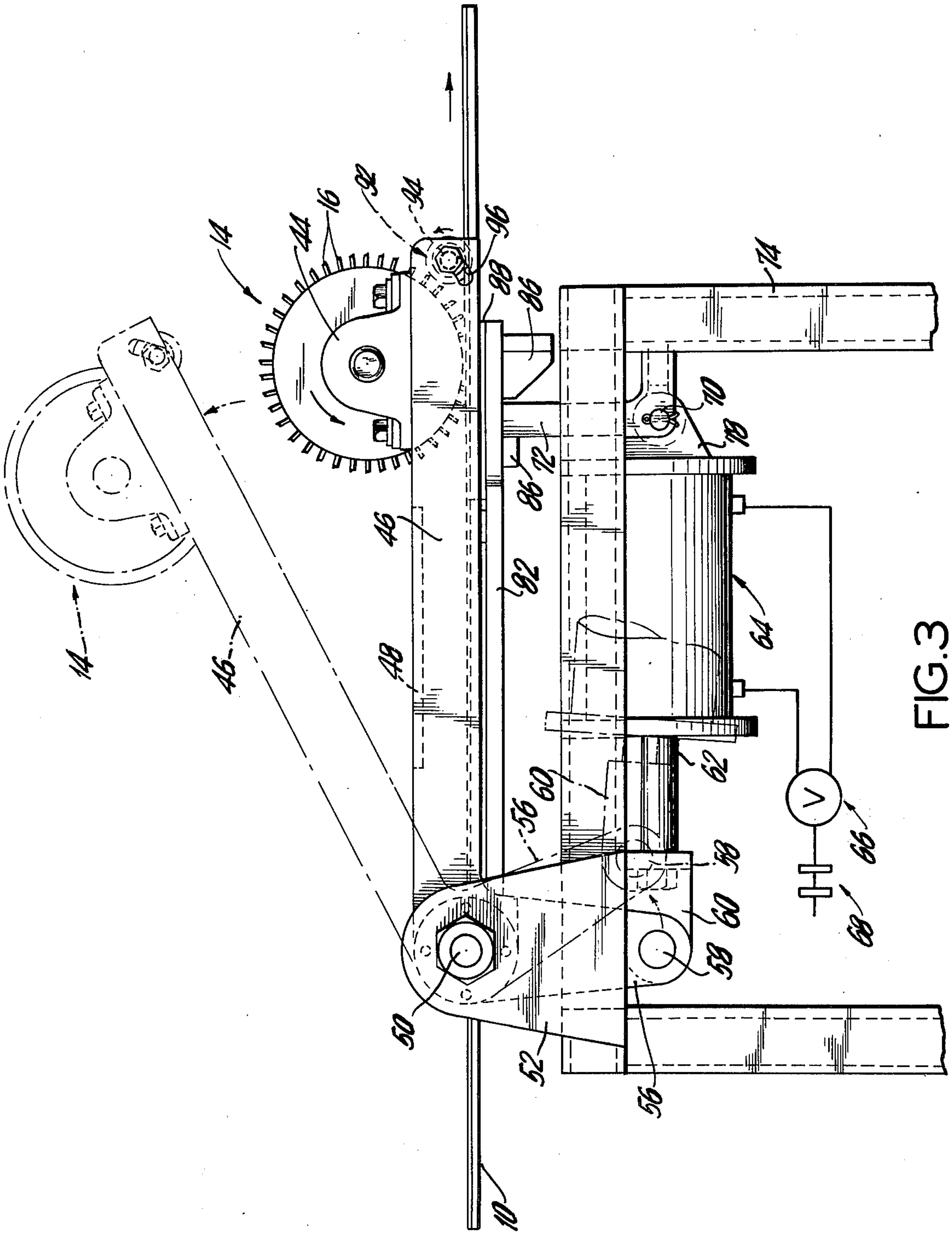
FIG. 3 is a side elevation of the structure of FIGS. 1 and 2 showing a punching roll in phantom lines in a non-operating position and also illustrating, in part schematically, the power structure for displacing the punching roll between its operating and non-operating positions.

The levers 46 are actually in the form of bell cranks having downwardly extending arms 56 interconnected by a rod 58 which passes through aligned openings of a U-shaped motion-transmitting member 60 connected as shown in FIGS. 2 and 3 to a rod 62. As may be seen from FIG. 3, the rod 62 is a piston rod of a fluid-pressure actuator means 64 including a cylinder for receiving fluid under pressure and housing a piston fixed to the piston rod 62. Through a suitable valve 66 and controls 68, it is possible to introduce fluid under pressure at either end of the cylinder. The right end of the means 64 is carried by a rod 70 which extends horizontally through bores of a pair of substantially L-shaped members 72 which are rigidly fixed as by welding at their lower horizontal legs to the front part 74 of the frame means. As is shown in FIG. 2, the pair of L-shaped members 72 are interconnected by a bracing plate 76 the right end of which is welded to the frame structure 74. FIG. 2 also illustrates a pair of ears 78 fixed to and projecting from the right end of the cylinder of the pneumatic means 64 and formed with aligned openings through which the rod 70 passes, the plate 76 itself carrying an ear 80 through which the rod 70 passes.

Thus, with this construction when fluid under pressure is introduced to the left end of the fluid-pressure means 64, as viewed in FIG. 3, the piston rods 62 will be retracted toward the right into the cylinder causing the lever members 46 to swing upwardly from the solid to the dot-dash line position shown in FIG. 3, thus displacing the punches from the solid operating position shown in FIG. 3 to the dot-dash line non-operating position illustrated. As a result of this arrangement it is possible very conveniently to situate the structure in the non-operating position enabling the sheet to be initially properly situated before the operations are started.

A guide means is provided for guiding the sheet 10 for travel in the plane referred to above in connection with FIG. 7. This guide means includes a table 82 which has at the rods 50 a pair of upwardly extending ears 84 formed with aligned bores through which the rods 50 pass. Thus, in this way the table 82 itself can be swung on the rods 50. It will be noted from FIG. 2 that the levers 46 as well as the table 82 are supported for swinging movement by way of suitable bearings. At its end region which extends beneath the punches the table 82 simply rests directly on the top end of the L-shaped member 72 as indicated most clearly in FIG. 3, and depending from the table 82 are elements such as stops 86 for contributing to a determination of the vertical position of the table 82. It will be appreciated that when the levers 46 are swung up to non-operating position shown in dot-dash lines in FIG. 3, the table 82 can also be swung up and then returned back down to the top ends of the L-shaped support member 72. In this way it is possible to clean structure on the table 82 in a more convenient manner if necessary.

According to a further feature of the invention, the table 82 carries a pair of slotted anvil members 88. These anvil members are apparent from FIGS. 1 and 2 while being shown in section in FIG. 4. The anvil members 88 are fixed to the table 82 in any suitable way as by being bolted or welded thereto, and the anvil members 88 form part of the guide means for guiding the sheet material 10 for movement in the plane illustrated in FIG. 7. The anvil members 88 are formed with longitudinal grooves 90 just wide enough to receive the several punches 16 without any excessive frictional rubbing of the punches against the sides of the grooves 90. Of course, the grooves 90 are respectively aligned with the several planes in which the several circumferential rows of punches 16 are situated. Therefore, each hole will be made by the combined piercing action of the leading and trailing tips 20, 22 of a punch, as well as by the shearing action of the two lateral sides of each punch with the side edges of each groove 90.

Thus, with the above-described structure of the invention as the rolls 12 rotate in the manner shown schematically in FIG. 7 in order to feed the sheet material 10 in the horizontal plane occupied by the sheet material 10, the punches 16 successively pierce through the sheet material to punch the latter. With this particular arrangement the punch-mounting means 14 is freely rotatable at the bearings in the blocks 44 as pointed out above, so that the means 14 is rotated only in response to linear movement of the sheet 10 by the means 12. As the several punches 16 penetrate through the sheet material they form the desired pattern of perforations therein during each revolution of the means 14. In addition the portions of the sheet material punched out of the latter are received in the grooves 90, and as the several punches 16 move into and out of the grooves 90 they also move longitudinally therealong so as to serve to displace previously punched out material from the grooves, thus maintaining them clean.

Figure 5:
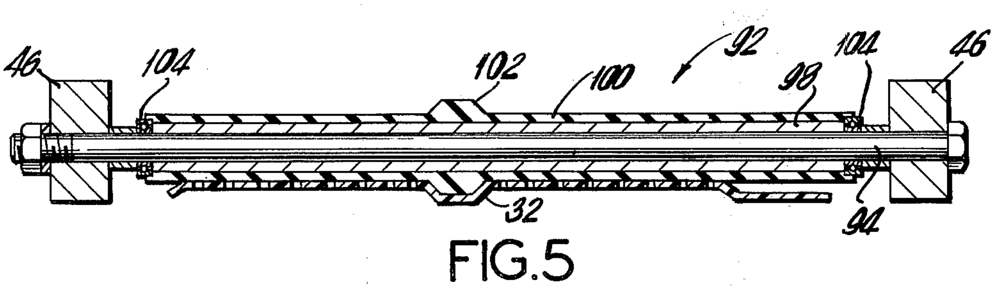
FIG. 5 is a sectional view taken along line 5—5 of FIG. 2 in the direction of the arrows and showing the construction of a stripping roll.

As may be seen from FIG. 3 in particular, the right ends of the anvil members 88 are aligned with the right end of the table 82. However, the levers 46 project to the right, in the direction of sheet travel as viewed in FIG. 3, beyond the ends of the table 82 and the anvil members 88. This length of the levers 46 is provided so that at the free ends thereof the levers 46 can support a roller stripping means 92 shown most clearly in FIG. 5. The stripping means 92 includes a rod 94 which extends through arcuate slots 96 formed in the free ends of the levers 46 as shown most clearly in FIG. 3. As a result when the levers 46 are turned to the non-operating position the rod 94 will fall to the bottom ends of the slots 96 while during operation the ends of the rod 94 will be situated at the top ends of the slots 96. The rod 94 extends freely through a sleeve 98 which is covered by a rubber sleeve 100 having a central circumferential projection 102 received in the longitudinal central groove 32 of the sheet material 10 so that the sleeve 100 serves by its projection 102 to precisely guide the sheet material with the latter also being guided by the inner edges of the anvil members 88 which engage the depressed portion 32 of the sheet as illustrated in FIG. 4. The sleeves 98 and 100 are supported for free rotary movement with respect to the rod 94 by way of suitable bearings 104.

Referring to FIG. 3, it will be seen that as the sheet 10 moves to the right beyond the table 82 and the anvil members 88, it will tend by frictional engagement with the punches 16 to move with the latter around the axis of rotation of the means 14. However, the sheet material instead of following the rotary movement of the means 14 presses upwardly against the stripping means 92 urging the latter into engagement with the upper ends of the slots 96, so that in this way the stripping means 92 serves to assure separation of the perforated sheet 10 from the perforating punches. In this way the sheet material continues to travel in the predetermined plane toward the next machine station (not shown) such as a cutter to cut the soffit panel into predetermined lengths.

Figure 6:
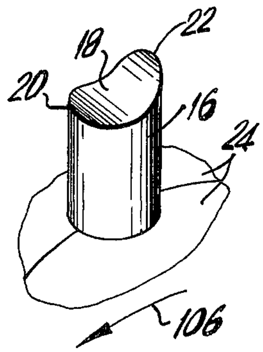
FIG. 6 is a perspective illustration of one of the punches of the invention shown projecting from the fragmentary illustrated punch-mounting means.

The manner in which one of the punches 16 appears as it projects from the registering grooves of a pair of adjoining discs 24 is particularly apparent from FIG. 6. In the direction of rotation indicated by the arrow 106 in FIG. 6, it will be seen that the leading tip 20 projects from the discs 24 to an extent less than the trailing tip 22.

It will be seen that as a result of this contruction it is possible as described above to provide the construction shown in FIG. 7 where the leading and trailing tips simultaneously engage the sheet 10 when initially contacting the latter, these tips respectively moving along the circular arcs 108 and 110 indicated in FIG. 7. In a particular example of the invention which has been constructed and which has been operating with polyvinyl chloride sheet material, a tangent to the circular arc 110 at the location where the trailing tip 22 of a punch 16 initially engages the sheet material makes with the plane occupied by the sheet 10 (or in other words with a straight line extending between the leading and trailing tips 20 and 22) an angle on the order of 17°. However, this is only a particular example and will be different depending upon different applications. In other words, depending upon such factors as the diameter of the discs which form the mounting means 14, the extent to which the punches 16 project beyond the peripheries of these discs, and the location of the plane occupied by the sheet material 10, this angle will vary. However, according to the invention this angle is always such that the leading and trailing tips 20 and 22 substantially simultaneously engage the sheet material when initially contacting the latter to achieve the results of the invention as set forth above.

When initially starting up the apparatus of the invention, the pneumatic means 64 will be operated to displace the structure to the non-operating dot-dash line position shown in FIG. 3. After an initial portion of the sheet 10 is guided beneath the punching roller and stripping roller and slides along the top surfaces of the anvils 88 which form part of the guide means, the flow of air pressure is reversed in the means 64 to return the parts to their operating position, and this will result in piercing of the sheet material by the punches and engagement of the sheet material by the stripping means so that during the continued feeding of the sheet material by the rolls 12 the perforations will be provided in the desired pattern.

As was pointed out above, this structure can operate in such a way that the sheet material can travel at the speed at which it is extruded. Moreover, a structure according to the invention has been operated continuously for several weeks without requiring any interruption in the operations or any maintenance operations. It is clear, however, that if maintenance is required, then only simple tools readily available in any shop will suffice for providing the desired maintenance.

While the invention has been disclosed as preferably using a circular punch, those skilled in the art will readily appreciate that the inventive principles can also be applied to punches of rectangular or other shape cross-section.

What is claimed is:

1. In an apparatus for perforating sheet material, guide means for guiding the sheet material for movement in a predetermined plane during perforation of the sheet material, rotary punch-mounting means, and support means supporting said rotary punch-mounting means for rotation in a given direction about an axis parallel to and spaced from said plane, with said axis extending transversely with respect to the direction of travel of the sheet material in said plane, said rotary punch-mounting means including a plurality of uniform thickness adjacent flat circular discs each having a plurality of substantially semi-circular cavities radially disposed about the periphery of said discs, each of said cavities being disposed adjacent a similar cavity on the adjacent flat circular disc to form a circular punch receiving aperture, and a plurality of circular punches carried by said punch-mounting means and located in said punch receiving apparatus for rotary movement in said given direction therewith about said axis, axial clamping means carried by said support means for holding said adjacent circular discs in tight clamping relation with said punches and acting as the sole means for securing said punches upon said punch mounting means, said punches extending outwardly beyond said punch-mounting means through a distance sufficient to pierce through the sheet material in said plane, so that during rotary movement of said punch-mounting means said punches approach said plane, contact and punch through the sheet material in said plane and then are retracted from the sheet material, each of said punches having an outer punching end which is concave and forms part of a cylinder whose axis is perpendicular to the axis of the punch and parallel to the axis around which said punch-mounting means turns, said concave punching end being offset to the axis of each said punch to form a curved leading punch tip and a curved trailing punch tip, the radial distance of said leading punch tip to the axis of rotation of said punch-mounting means being less than the radial distance of said trailing punch tip so that each curved tip contacts the sheet material to be punched substantially simultaneously.

2. The combination of claim 1 wherein said guide means includes a planar anvil formed with a plurality of parallel sided parallel grooves of a width slightly in excess of the width of the circular punches into which said punches extend when rotating.

3. The combination of claim 2 and wherein said punches have inner ends and said semi-circular cavities also have inner ends engaged by the inner ends of said punches.

4. The combination of claim 2 and wherein said anvil is stationary and said grooves thereof extending in the direction of travel of the sheet material so that said punches serve the added function of removing from said grooves portions of the sheet material punched out of the latter by the punches.

5. The combination of claim 4 and wherein said support means supports said rotary punch-mounting means for movement toward said plane to an operating position and away from said plane to a non-operating position.

6. The combination of claim 2 and wherein said support means includes a lever carrying said punch-mounting means, and frame means supporting said lever for swinging movement about a pivot axis spaced from and parallel to the axis of rotation of said punch-mounting means.

7. The combination of claim 6 and wherein a power means is operatively connected with said lever for turning the latter about said pivot axis to displace said punch-mounting means between said operating and non-operating positions thereof.

* * * * *